(12) United States Patent
Fetzer

(10) Patent No.: US 6,390,504 B1
(45) Date of Patent: May 21, 2002

(54) MOBILE CONCRETE PUMP

(75) Inventor: Johann Georg Fetzer, Nersingen (DE)

(73) Assignee: Waitzinger Baumaschinen Vertrieb und Service GmbH, Nersingen (DE)

( * ) Notice: Subject to any disclaimer, the term of this patent is extended or adjusted under 35 U.S.C. 154(b) by 0 days.

(21) Appl. No.: 09/485,024

(22) PCT Filed: Mar. 19, 1999

(86) PCT No.: PCT/DE99/00877

§ 371 Date: May 9, 2000

§ 102(e) Date: May 9, 2000

(87) PCT Pub. No.: WO99/67482

PCT Pub. Date: Dec. 29, 1999

(30) Foreign Application Priority Data

Jun. 20, 1998 (DE) .......................................... 298 11 097

(51) Int. Cl.$^7$ ................................................. B60S 9/02
(52) U.S. Cl. ..................................................... 280/763.1
(58) Field of Search ........................... 280/763.1, 764.1, 280/765.1, 766.1; 212/302–304

(56) References Cited

U.S. PATENT DOCUMENTS

| | | | | |
|---|---|---|---|---|
| 3,337,063 A | * | 8/1967 | Testore | 212/304 |
| 3,981,514 A | * | 9/1976 | Visser | 280/765 |
| 5,387,071 A | * | 2/1995 | Pinkston | 414/563 |
| 5,961,145 A | * | 10/1999 | Schillinger et al. | 280/764.1 |
| 6,076,855 A | * | 6/2000 | Webb | 280/765.1 |

* cited by examiner

Primary Examiner—J. J. Swann
Assistant Examiner—L. Lum
(74) Attorney, Agent, or Firm—Herbert Dubno

(57) ABSTRACT

A mobile concrete pump with a chassis, a concrete distributing boom rotatable about a vertical axis and supported on a boom support, as well as with front support legs and rear support legs. Each front support leg and rear support leg arranged on the same side of the chassis of the chassis have a common pivot axis.

7 Claims, 9 Drawing Sheets

MOBILE CONCRETE PUMP

CROSS REFERENCE TO RELATED APPLICATIONS

This application is a national stage of PCT/DE99/00877 filed Mar. 19, 1999 and based upon German National application 298 11 097.0 of Jun. 20, 1998 under the International Convention.

FIELD OF THE INVENTION

The invention relates to a mobile concrete pump with a chassis, a concrete distributing boom rotatable about a vertical axis, arranged on a boom support, as well as with front support legs and rear support legs.

BACKGROUND OF THE INVENTION

Mobile concrete pumps as described above are used on construction sites for distributing concrete from a central location over a wide area so that, in a pouring process with continuous concrete supply by means of concrete mixers, large concrete slabs can be produced. Furthermore mobile concrete pumps offer the possibility of transporting concrete to high-lying work levels with little effort, a purpose for which in practice mobile concrete pumps whose distributing boom surpasses a height of 60 m have already been used. At such dimensions it is obvious that the stability of the mobile concrete pump presents a problem. In order to insure under all operational conditions a stable platform for the mobile concrete pump with the desired extension of the distributing boom, the front and rear support legs are arranged on the chassis and customarily at the corners of the chassis. However this means that the entire chassis is exposed to the full impact of the distributing boom force and therefore has to be manufactured to be correspondingly stable. For this reason the leg locations were changed by moving the pivot bearings for the front and rear support legs away from the chassis corners and to bring them closer, so that the pivot bearing for the rear support legs is located close to the rear axle of the chassis. It has been found that with the increasing closeness of the pivot bearings to one another torsion problems arise. Furthermore the pivot bearings of the front and rear support legs are arranged relatively far to the rear of the chassis, which requires that the front support legs be extendable very far towards the front so that they are designed to be telescopic. Finally the boom support also projects very far forward on the chassis. As a result of the telescopic support legs and the projecting boom support the flexibility of the mobile concrete pump increased, where actually stability is necessary and desired.

It is desired to spread the front and rear support legs as far away as possible from the chassis to provide a secure stand. However the front and rear support legs in their rest position have to be lodged on the pump in order to move it. Therefore, in order to be able to lodge a sufficient length of the front and rear support legs on the chassis, it has already been proposed to let the front support legs extend rearwardly and the rear support legs forwardly for storage, thereby making use of the length offered by the chassis. However this requires sufficient available space at the construction site so that the front and rear support legs can be deployed from their rest position to their work position in a circular motion passing over an apex. Furthermore in some mobile concrete pumps the support legs are telescopic so that in the rest position only little space is required, while a wide range is available in the work position. The telescopes can impair the stability, aggravating by the increasing number of telescope segment.

OBJECT OF THE INVENTION

It is the object of the invention to provide a mobile concrete pump of the aforementioned kind so that expensive reinforcement of the chassis for avoiding torsion between the pivot bearings of the front and rear support legs can be eliminated, and so that the front and rear support legs in long construction style can be lodged on the chassis without large space requirements during the transfer from the rest position to the work position.

SUMMARY OF THE INVENTION

According to the invention, this object is achieved in a mobile concrete pump of the aforementioned kind in that each front support leg and rear support leg arranged on the same side of the chassis have a common swivel axis.

This offers the advantage that only the area directly between the boom support and the pivot axis need be of a particularly stable construction, since the forces from the concrete distributing boom are channeled directly via the boom support and this intermediate area to the support legs, so that the rest of the chassis is not under load. The arrangement of the pivot bearings on a common pivot axis offers an additional space advantage, because the support legs can be made longer in the longitudinal direction of the chassis, since it is no longer necessary to provide a specimens between the swing bearings.

Advantageously the front support legs and the rear support legs are supported on the boom support. During operation while pumping, the concrete distributing boom with boom support and the front and rear support legs can be considered as a self-sufficient unit, which solely for the desired mobility is arranged on the chassis, which in itself does not have to be reinforced, so that cost advantages result for the manufacturer, and furthermore the low inherent weight allows for greater load. With regard to sufficient space availability for a stable support it is advantageous when a base plate is assigned to the boom support, on which the front support legs and rear support legs are lodged.

Within the framework of the invention it is further provided that the front support leg and the rear support leg on the same side are pivotally supported on a bolt arranged coaxially to the pivot axis. The bolt forming a common pivot bearing for the front and rear support legs is fastened in a simple manner by means of a mounting.

A somewhat more complicated mounting is required when the front support leg and the rear support leg on the same side are pivotally supported on separate bolts coaxial with the pivot axis. However this offers the advantage that torsion and bending forces acting on the bolt simultaneously from the front support leg and the rear support leg are avoided.

Each front support leg can be formed by a tubular guide rotatable about the pivot axis, wherein a slide tube present in the support base of the front support leg and traversing the tubular guide is slidably supported in its rest position. This embodiment offers the advantage that the front support leg in its rest position can be positioned on the chassis so that it does not project into the wheel boxes, which have to be kept clear for the wheels. Compared to a construction based exclusively on telescopic means, the support leg has the advantage that the segment connected to the swing bearing does not limit the base length which is formed because of the distance between the clear space reserved for the support leg on the chassis and the pivot bearing. The frequently practiced move to place the swing bearings further rearward, in order to create a sufficient base length, and in this way to accept a shortening of the rear support legs, as well as an indispensable reinforcement of the chassis, is no longer necessary.

Of course it is possible, in order to increase the range of the front support legs, to design the slide tube as a telescope, this way also making use of the inherent advantages, whereby the first segment of the telescope can use the entire length of the slide tube.

In order to support the front leg on the chassis in the most compact manner it is advantageous for the chassis to have a recess, into which the rear end of the slide tube can project. The part of the slide tube rearwardly projecting beyond the pivot axis can enter this recess and can be swung and guided past the construction elements located on the chassis, in order to slide the slide tube into the tubular guide.

In alternative embodiment the rear support leg has a recess into which the slide tube projects in its rest position, and thus way the rear support leg can be thicker and more rigid without increasing the cumulative dimension of the rear and front support legs.

Suitably in this embodiment the rear support leg has two mounting plates by means of which it is connected to the bolt and between which the front support leg is coupled with the bolt. In the rear support leg can be left free between the mounting plates so that the pivot angle of the tubular guide is not impaired.

The concrete distributing boom with the boom support is mounted directly on the chassis close to the front axle, which increases the rigidity and improves stability due to the lack of intermediate members.

BRIEF DESCRIPTION OF THE DRAWING

The invention is explained in greater detail with reference to the embodiments illustrated in the drawing.

In the drawing.

SPECIFIC DESCRIPTION

Figure 1:
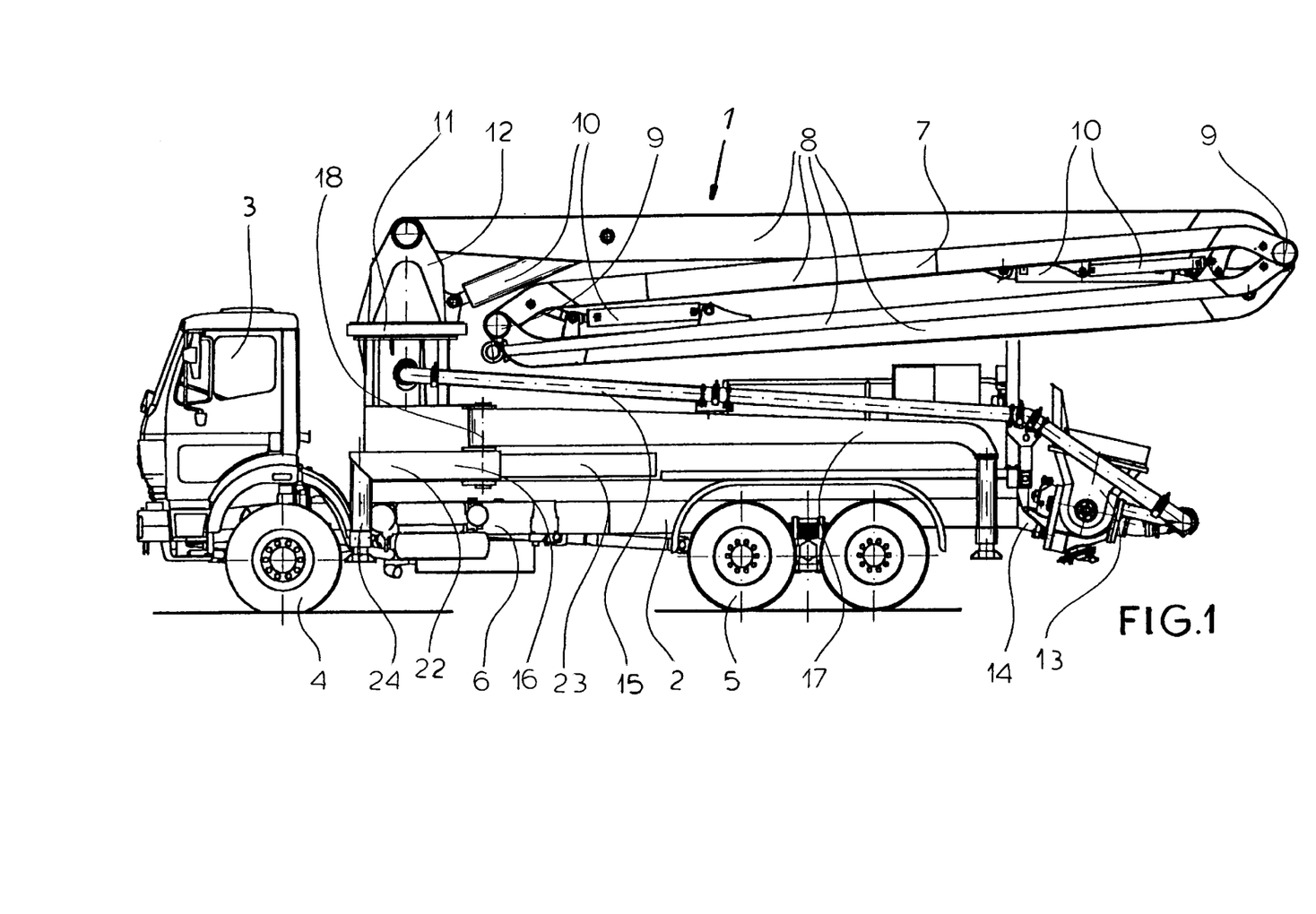
FIG. 1 is a side view of the mobile concrete pump according to the invention, with front and rear support legs in the rest position.

The mobile concrete pump illustrated in FIG. 1 comprises a chassis 2 which is formed by a conventional truck with an operator cabin 3, a front axle 4 and a double rear axle 5 and a frame 6 connecting these components. On the chassis 2 a concrete distributing boom 7 is shown in its rest position. In the illustrated embodiment the boom 7 has boom members 8 interconnected by articulations 9 and which can be displaced with respect to each other by means of a hydraulic mechanisms 10. The strongest lower member 8 is connected to a boom support 11, which in turn is directly supported on the chassis 2 close to the front axle, in the frontal third of the distance between the front axle 4 and the double axle 5. The concrete distributing boom 7 is rotatable about a vertical axis 12, so that by the articulations 9 of the concrete distributing boom 7 any desired position can be reached within the radius corresponding to the concrete distributing boom in its extended configuration. At the rear end of the chassis 2 a feeding box 13 is arranged, through which concrete is fed to a solid-material pump 14, which pumps the concrete through a duct 15 to the boom support 11 and through the same to a hose arranged on the concrete distributing boom 7, so that the concrete introduced through the feeding box 13 exits the hose at the free end of the concrete distributing boom 7 and can be processed there.

Figure 7:
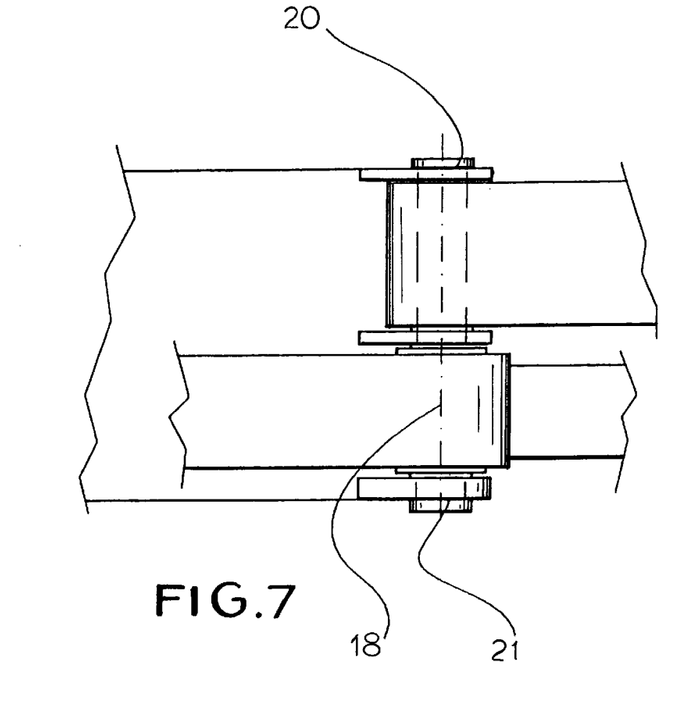
FIG. 7 is a schematic representation of two coaxially arranged bolts forming the pivot bearings for the front and rear support legs.
Figure 8:
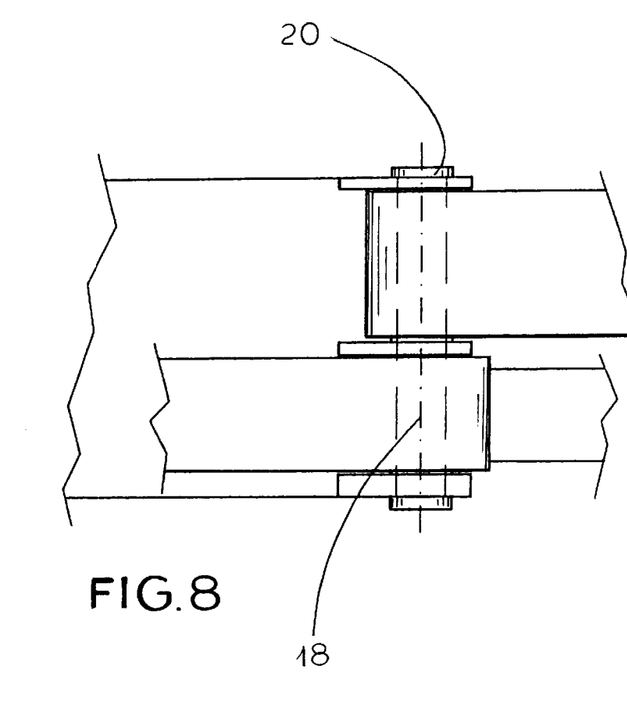
FIG. 8 is a representation corresponding to FIG. 7 of an embodiment with a common bolt for the pivot bearings of the front and rear support legs.
Figure 9:
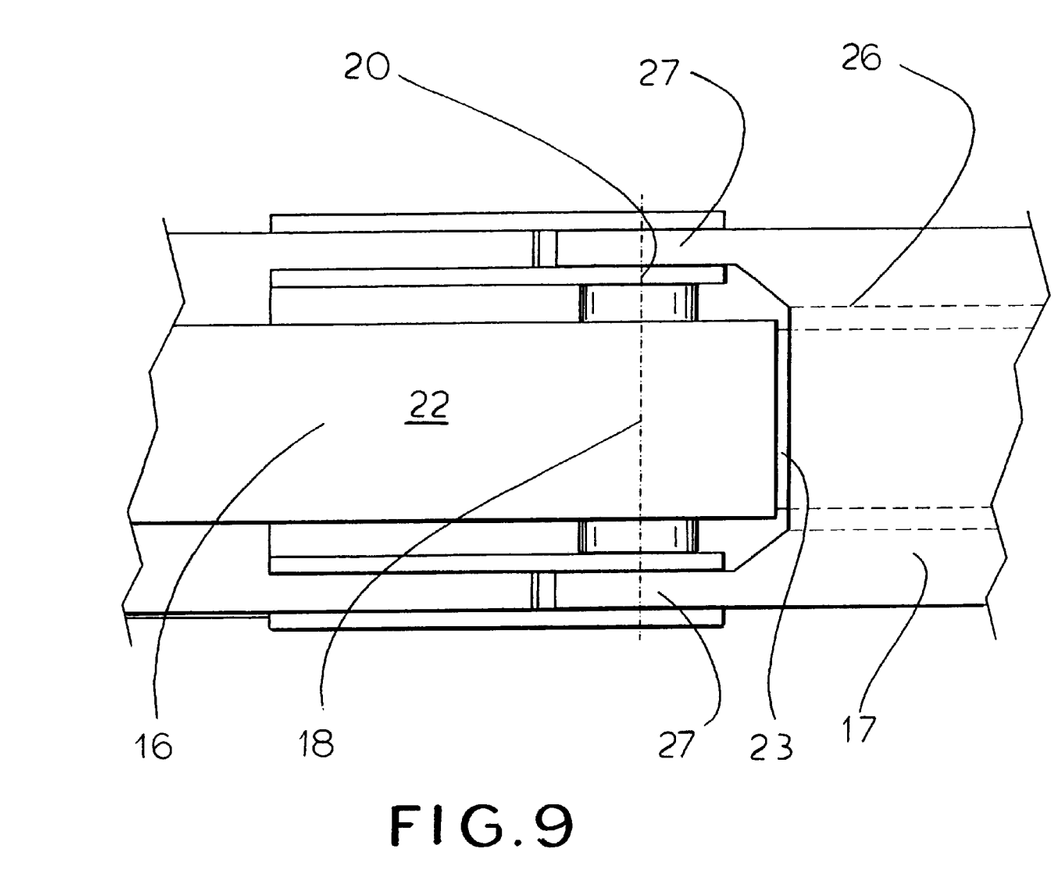
FIG. 9 is a representation corresponding to FIG. 7 of an embodiment with a slide tube according to FIG. 1a projecting into the rear support leg.

On the chassis 2 two front support legs 16 and two rear support legs 17 are arranged, which serve for stabilizing the concrete pump 1 during the pumping process, so that a swinging motion of the concrete distributing boom 7 can take place without endangering the personnel or the material. The front support leg 16 and the rear support leg 17 respectively arranged on the same side of the chassis 2 have a common vertical pivot axis 18, about which the swing or pivot bearing assigned to the front support leg 16 and the rear support leg 17 can be rotated. The front support legs 16 and the rear support legs 17 are fastened to a base plate 19 assigned to the boom support 11 via the swing bearing. In FIG. 7 with respect to the swing bearings an embodiment is shown wherein the front support leg 16 and the rear support leg 17 sit on separate bolts 20, 21, arranged coaxially with respect to each other and with respect to the pivot axis 18, while FIG. 8 shows an embodiment wherein only one bolt 20 coaxial with the pivot axis 18 is used.

Figure 2:
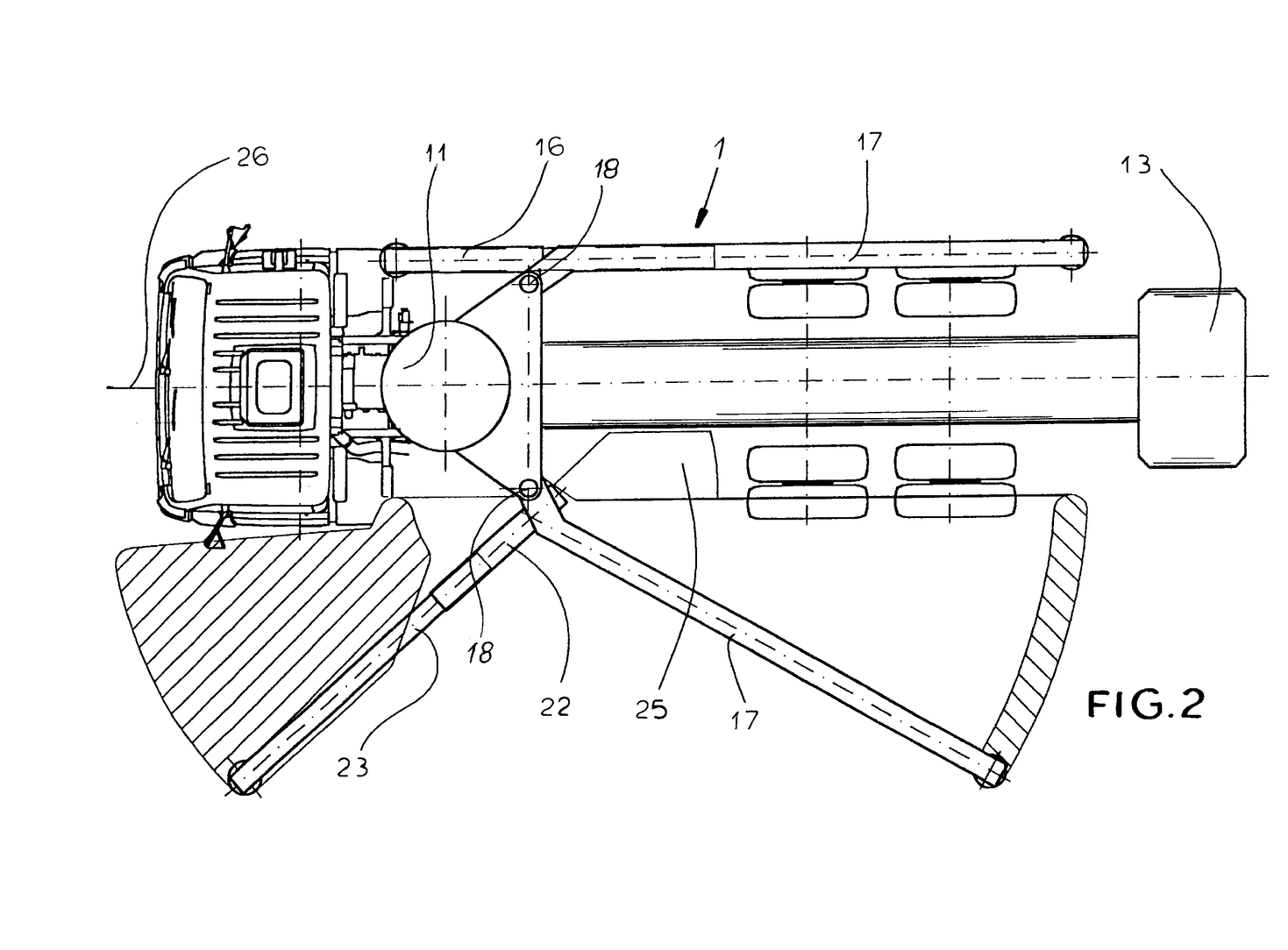
FIG. 2 is a top view of a schematic representation without concrete distributing boom, simplified with respect to FIG. 1.
Figure 3:
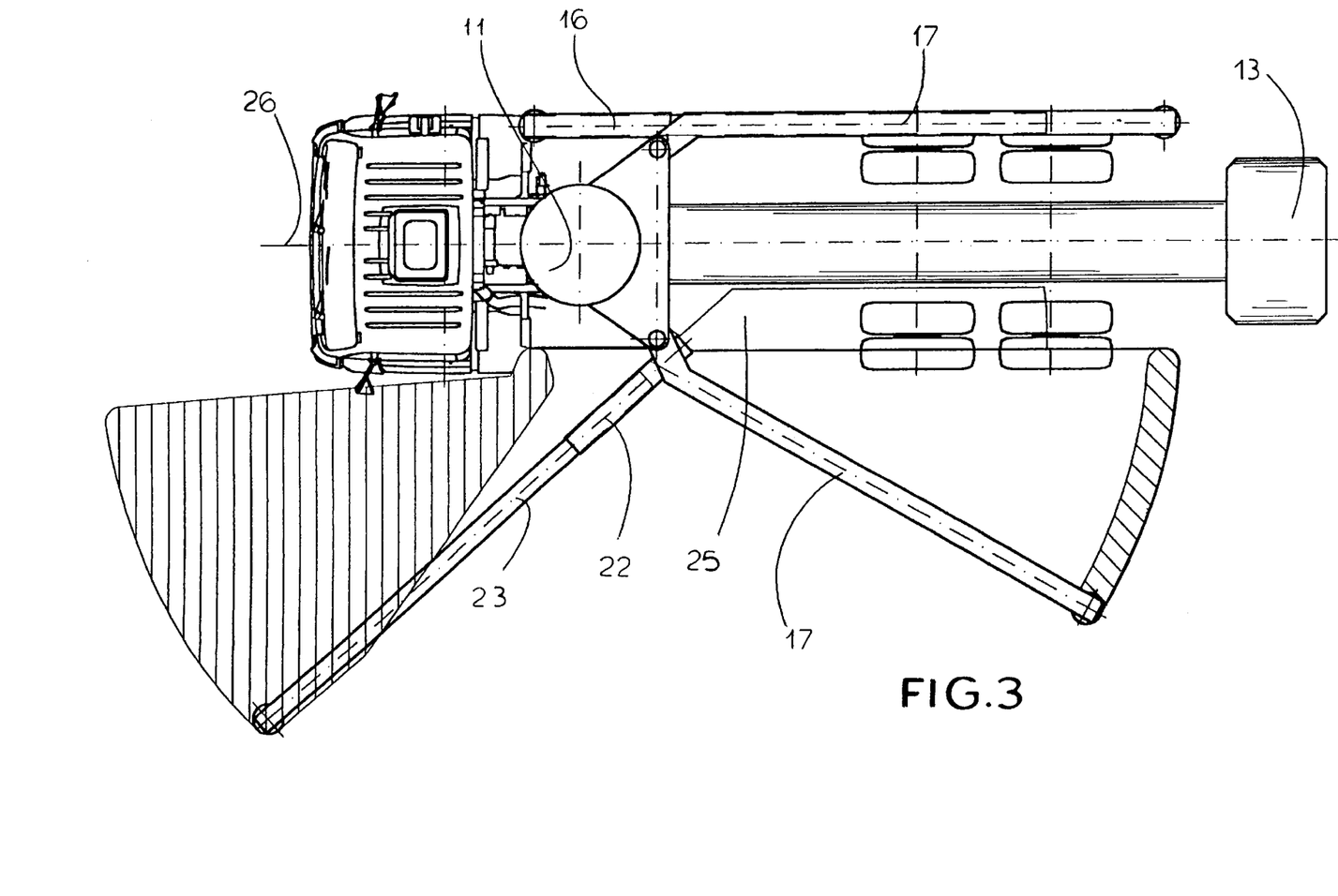
FIG. 3 is a representation corresponding to FIG. 2 with an alternate position of the front and rear support legs, FIG. 4 a representation corresponding to FIG. 2 with the placement of the front support legs in reduced space conditions, FIG. 5 a representation corresponding to FIG. 2 of an embodiment with maximally extended front and rear support legs requiring the largest possible work surface.
Figure 4:
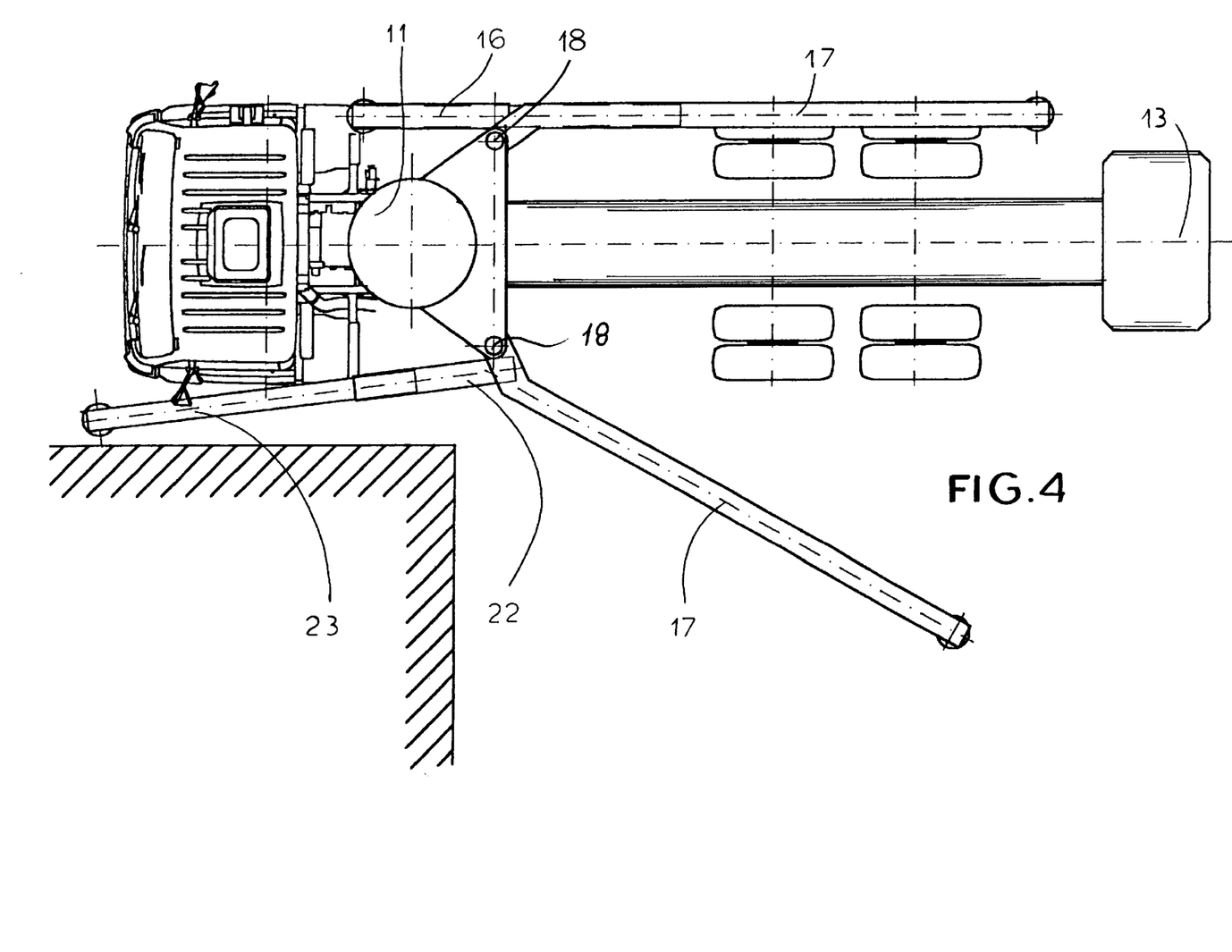
Figure 5:
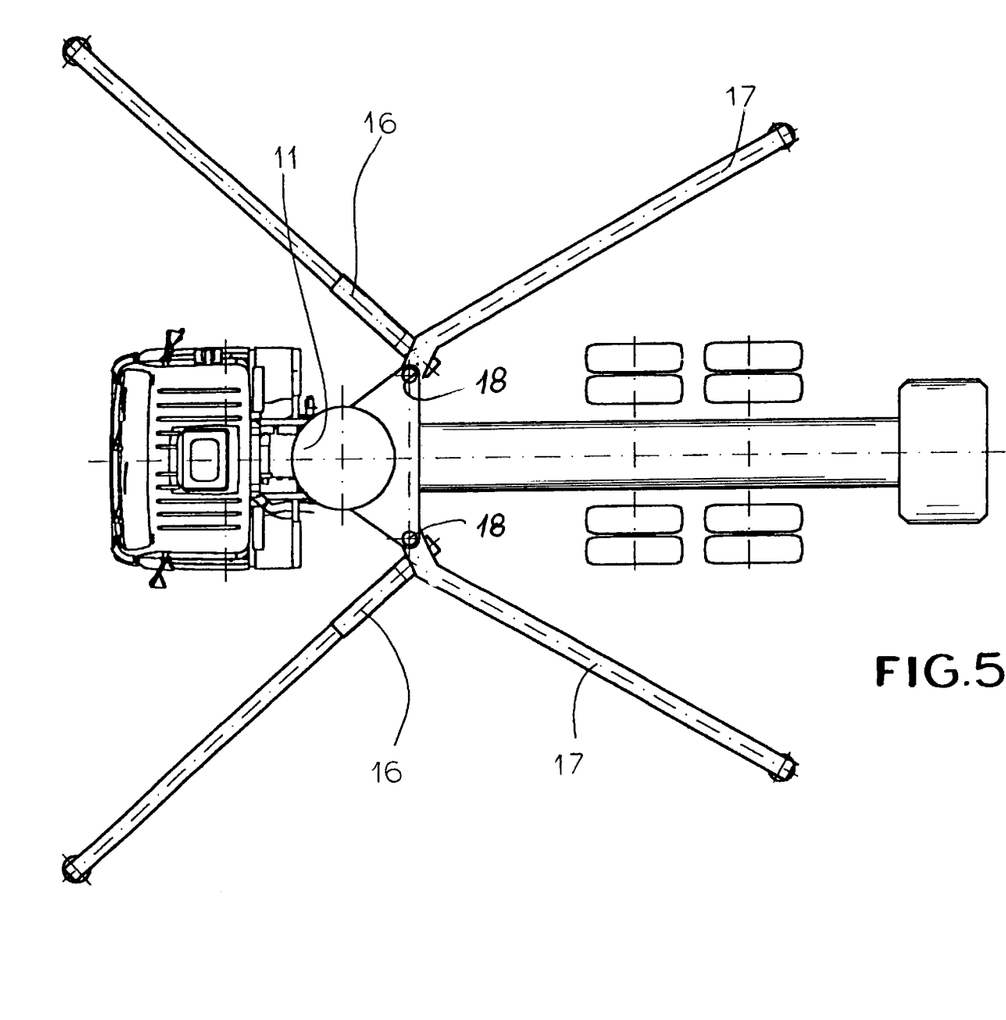
Figure 6:
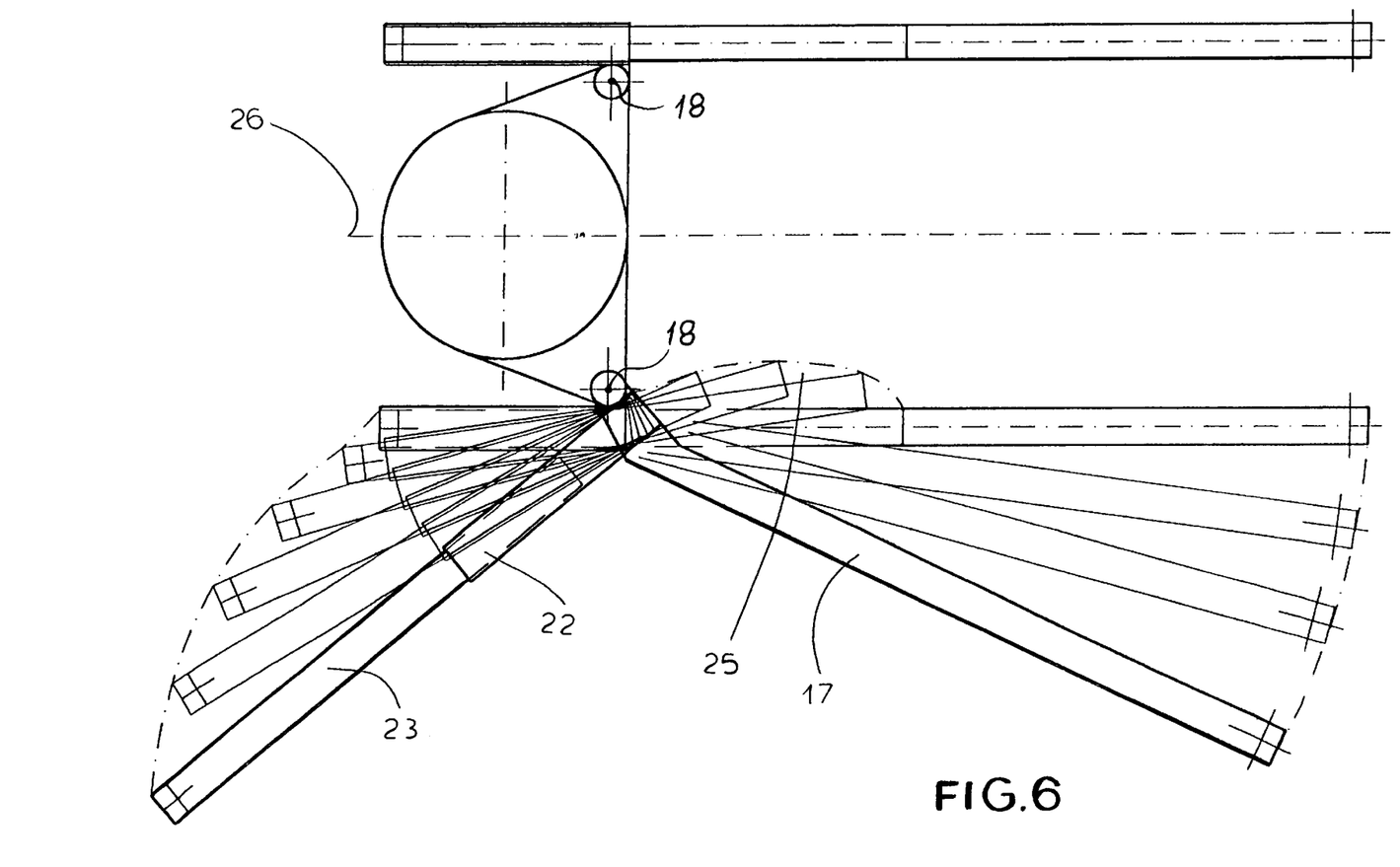
FIG. 6 is a top view on a boom support with front and rear support legs, with a sequence of the possible positions assumed during transition from the rest position into the work position.

Again from FIG. 1 can be seen that the front support leg 16 is formed by a tubular guide 22 pivotable about the pivot axis 18. In this tubular guide 22 a slide tube 23 is slidably supported, which in the rest position of the front support leg 16 shown in FIG. 1 projects rearward through the tubular guide 22, so that the support base 24 arranged on the slide tube 23, is placed in the rest position in a clear space available on the chassis 2. Further on the chassis 2 a recess 25 is formed, as can be seen from FIG. 2, into which the rear end of the slide tube 23 can project, so that for the transition of the front support leg 16 from its rest position shown in FIG. 1 to its work position shown in FIG. 2, the tubular guide 22 with the slide tube 23 can be swung from a position parallel to the longitudinal axis 26 of the chassis 2. For this rotating motion only little space is required at the construction site where the mobile concrete pump 1 is used, since the displacement of the slide tube 23 within the tubular guide 22 takes place only when the desired pivot angle is reached. Then in this position the displacement of the slide tube 23 takes place, in order to displace the frontal support point sufficiently far away from the boom support 11. From FIGS. 2–5 it can be seen that, depending on the existing space availability, a different positioning of the front support legs 16 is possible. In order to increase the reach of the front support legs 16, the slide tube 23 can be a telescope.

Figure 1A:
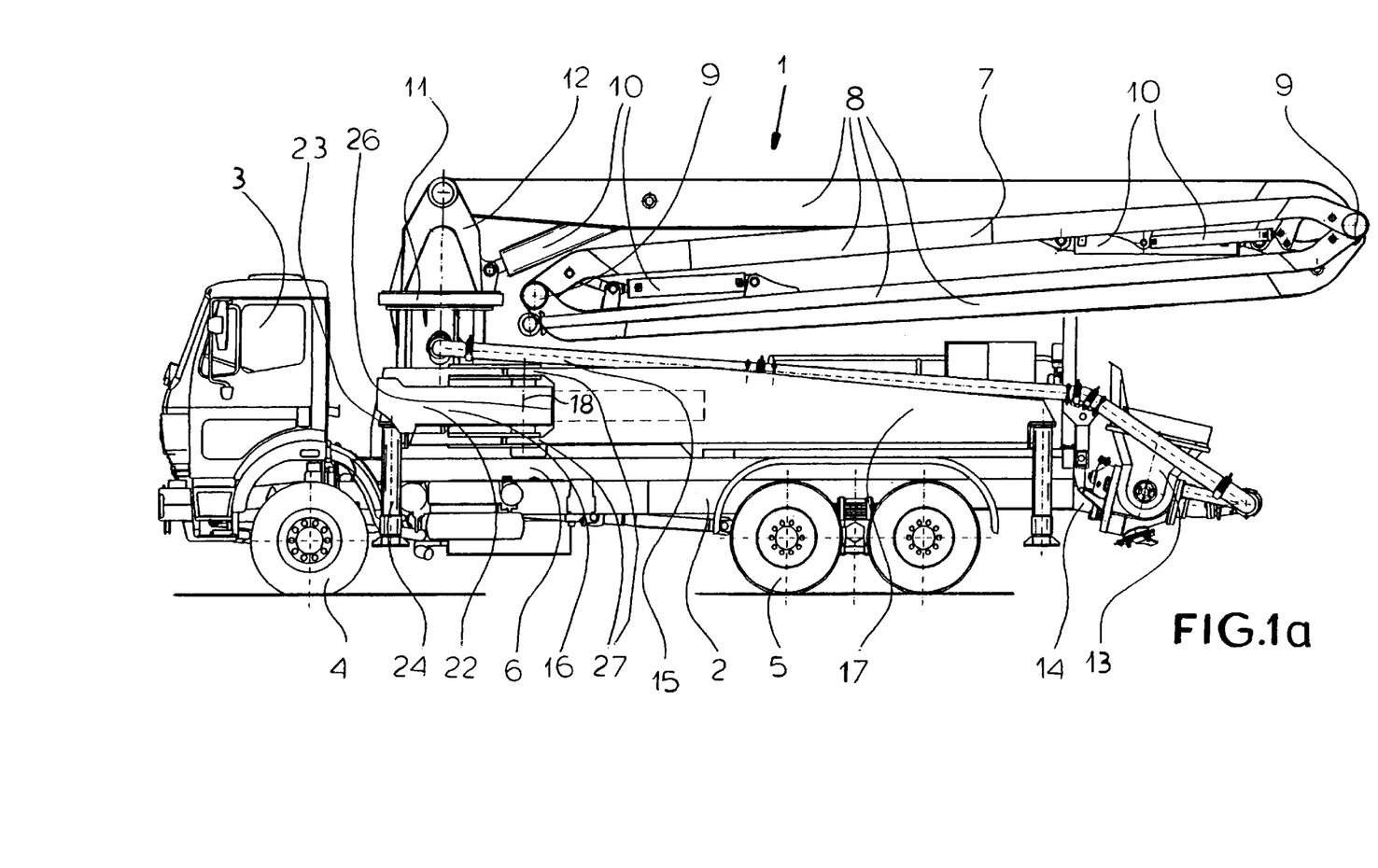
FIG. 1a is a representation corresponding to FIG. 1 of an embodiment with the slide tube of the front support leg projecting into the rear support leg.

FIG. 1a shows a further embodiment wherein the rear support leg 17 has a recess 26 into which the slide tube 23 projects in its rest position. The rear support leg 17 has thereby two mounting plates 27, by means of which it is attached to the bolt 20, whereby the front support leg is guided between the mounting plates 27 towards the bolt 20. In order not to reduce the pivot angle of the tubular guide 22 in this configuration, the rear support leg 17 is kept clear between the two mounting plates 27 to the extent that the end of the tubular guide 22 facing the rear support leg 17 can be freely swung about the bolt 20.

I claim:

1. A mobile concrete pump comprising a chassis, a concrete distributing boom rotatable about a vertical axis on a boom support on said chassis and a front support leg and rear support leg on each longitudinal side of the chassis, the respective front support leg and rear support leg arranged on the same side of the chassis having a common pivot axis, the rear support leg having a receiving space into which a slide tube can project in a rest position thereof, the rear support leg having two mounting plates, by means of which it is attached to a bolt forming the respective pivot axis and between which the respective front support leg is coupled to the respective bolt.

2. A mobile concrete pump comprising:

an elongated chassis having a front end and a rear end and a pair of longitudinal sides extending between said ends;

a boom support on said chassis;

a concrete distributing boom rotatable about a vertical axis on said boom support;

a respective front support leg and a respective rear support leg on each of said longitudinal sides and swingable away from said chassis to support the concrete pump for operation of said boom; and respective pivots mounted on said boom support and on each of said longitudinal sides defining a common vertical pivot axis for the respective front support leg and rear support leg on each longitudinal side, a baseplate being provided for said boom support, said pivots being formed on said baseplate whereby the front support legs and the rear support legs are carried by said baseplate.

3. A mobile concrete pump comprising:

an elongated chassis having a front and and a rear end and a pair of longitudinal sides extending between said ends;

a boom support on said chassis;

a concrete distributing boom rotatable about a vertical axis on said boom support;

a respective front support leg and a respective rear support leg on each of said longitudinal sides and swingable away from said chassis to support the concrete pump for operation of said boom; and respective pivots on each of said longitudinal sides defining a common vertical pivot axis for the respective front support leg and rear support leg on each longitudinal side, each of said pivots being formed by a bolt coaxial with the respective pivot axis and supporting both the front support leg and the rear support leg on the respective longitudinal side of the chassis.

4. A mobile concrete pump comprising:

an elongated chassis having a front end and a rear end and a pair of longitudinal sides extending between said ends;

a boom support on said chassis;

a concrete distributing boom rotatable about a vertical axis on said boom support;

a respective front support leg and a respective rear support leg on each of said longitudinal sides and swingable away from said chassis to support the concrete pump for operation of said boom; and respective pivots on each of said longitudinal sides defining a common vertical pivot axis for the respective front support leg and rear support leg on each longitudinal side, wherein each front support leg being formed with a tubular guide swingable about the respective pivot axis and a telescopic slide tube projecting through the tubular position of the respective front support leg, said chassis having a recess into which a rear end of the slide tube can project, each rear support leg having a receiving space into which a respective slide tube of the respective front support leg on the respective longitudinal side of the chassis can project in a rest position thereof.

5. A mobile concrete pump comprising:

an elongated chassis having a front end and a rear end and a pair of longitudinal sides extending between said ends;

a boom support on said chassis;

a concrete distributing boom rotatable about a vertical axis on said boom support;

a respective front support leg and a respective rear support leg on each of said longitudinal sides and swingable away from said chassis to support the concrete pump for operation of said boom; and respective pivots on each of said longitudinal sides defining a common vertical pivot axis for the respective front support leg and rear support leg on each longitudinal side, wherein each front support leg being formed with a tubular guide swingable about the respective pivot axis and a telescopic slide tube projecting through the tubular position of the respective front support leg, said chassis having a recess into which a rear end of the slide tube can project, each rear support leg having two mounting plates for attachment to a bolt forming the respective pivot axis and between which the respective front support leg is coupled to the respective bolt.

6. The mobile concrete pump defined in claim 5 wherein the rear support leg is left clear between the mounting plates so as not to interfere with a pivot angle of the tubular angle guide.

7. The mobile concrete pump defined in claim 5 wherein said chassis has at least one front axle and at least one rear axle and said boom support is located in a region of said front axle.

* * * * *